Nov. 11, 1952 F. GRAY 2,617,981

CODER FOR PULSE CODE MODULATION SYSTEMS

Filed Nov. 16, 1949 2 SHEETS—SHEET 1

INVENTOR
F. GRAY
BY Hugh S. Wertz
ATTORNEY

INVENTOR
F. GRAY
BY Hugh S. Wertz
ATTORNEY

Patented Nov. 11, 1952

2,617,981

UNITED STATES PATENT OFFICE 2,617,981

CODER FOR PULSE CODE MODULATION SYSTEMS

Frank Gray, East Orange, N. J., assignor to Bell Telephone Laboratories, Incorporated, New York, N. Y., a corporation of New York Application November 16, 1949, Serial No. 127,740

11 Claims. (Cl. 332—11)

This invention relates to coding circuits and more specifically to such circuits for use in pulse code modulation systems.

It is an object of the present invention to effect a substantial simplification in electron beam coding tube structure as compared with the apparatus now commonly in use.

It is another object of the present invention to provide, in apparatus of this type, for the use of a greatly increased number of amplitude steps all within the limitations of practical electron beam tube construction.

In my copending application, Serial No. 127,739, filed November 16, 1949, there is disclosed a system for producing pulse code modulation signals by rapidly performing the same mathematical operation for each message wave sample, the first operation being performed on the sample, and subsequent operations being performed on the result of the next preceding operation. This mathematical operation proceeds according to a function designated the F-function, such that the output is equal to double the input for all inputs less than one-half the maximum amplitude range of the system and is equal to double the input minus the maximum amplitude range of the system for all inputs greater than one-half the maximum amplitude range. This F-function obviously may be considered as a combination of other functions and appropriate circuits and electron beam tubes may be accordingly designed to yield these component functions. One such component function, the use of which is both feasible and advantageous, has been designated the P-function and is such that the output is equal to the input for all inputs less than one-half the maximum amplitude range of the system and is equal to the input minus the maximum amplitude range for all inputs greater than one-half the maximum amplitude range. It is evident that the addition of the previous input to the output of such a P-type operator will yield a new input equal to the basic F-function, and, in accordance with this invention, circuits, electron tubes and techniques are herein disclosed to produce this P-function and to utilize it in producing pulse code modulation signals in a repeated feedback coding system.

Specifically, the mathematical operation is performed by a cathode-ray tube having a mask so apertured that the output produced by the beam impinging on a target located beyond the mask will be related to the beam-deflecting input (V) according to the P-function relationship, i. e., output equals P(V). The character of each code element is determined by whether the corresponding input to the tube is greater or less than one-half the maximum amplitude range.

This coding function, as well as the several coding devices themselves and the circuits associated therewith which can be used in the practice of the invention, will be more fully understood from the following drawings and the accompanying description, in which.

Figures 1, 2, 3, 4:
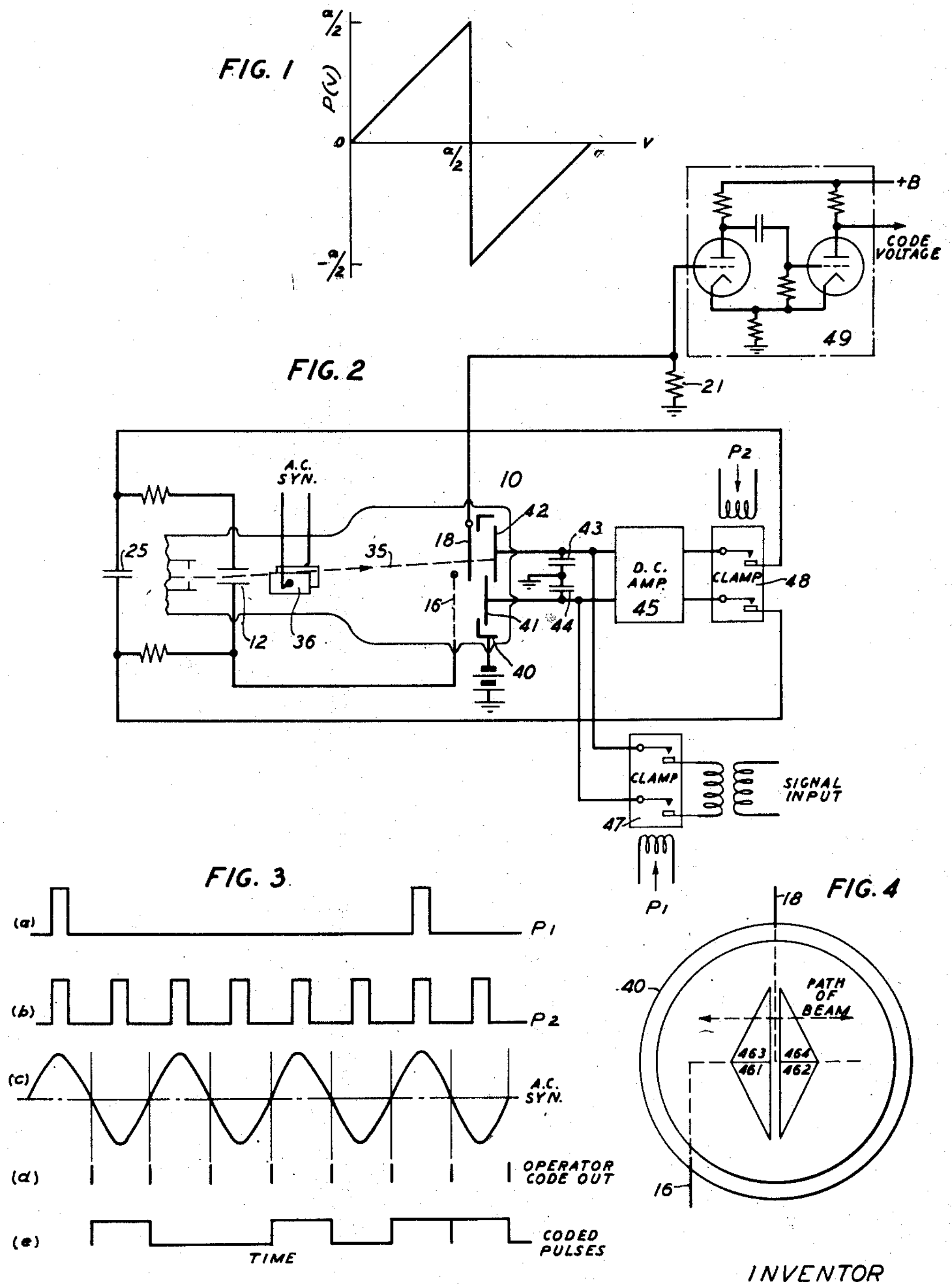
Fig. 1 is a plat of the function P(V)
Fig. 2 shows in schematic form an exemplary embodiment of a balanced version of the so-called P-type coding circuit, in which a beam of spot cross-section is used in the coding tube.
Fig. 3 illustrates the timing pulses and the synchronizing voltage employed in the practice of the specific embodiment of the invention shown in Fig. 2, as well as the operator code output and the coded pulses produced thereby.
Fig. 4 is a view of a coding tube mask which may be used to provide the P-type operator characteristics in a circuit such as that shown in Fig. 2.

In accordance with the invention, several exemplary arrangements of the beam coder mask and the circuits associated therewith have been devised to yield the desired operator characteristics of the coding function P(V), and in Fig. 1 there is shown the characteristic of such a P-type operator. The operator output voltage P(V) is plotted as the ordinate versus the operator input voltage V as the abscissa. The operator output-input relation between operator input values from V=0 to $$V=\frac{a}{2}$$

is a straight line with a slope of unity. From $$V=\frac{a}{2}$$

to V=$a$, the operator output varies from $$-\frac{a}{2}$$

to zero, in the same linear manner. It is evident that P(V) of Fig. 1 added to V will produce the coding function shown in Fig. 1 of the above-identified copending application, i. e., that $F(V)=V+P(V)$.

Figure 6:
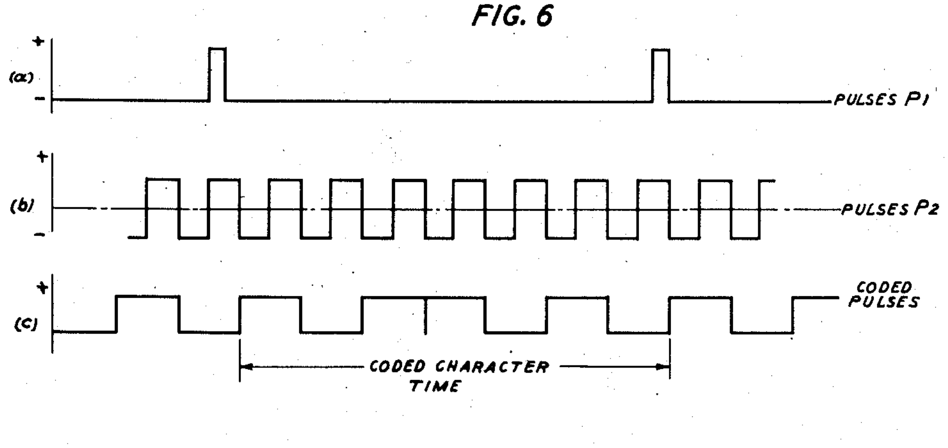
Fig. 6 shows the timing pulses employed in the practice of the specific embodiment of the invention shown in Fig. 4 and the coded pulses produced thereby.

One means of obtaining the P-type operator output and the addition thereof to the input voltage V is shown in the circuit schematic of Fig. 2. In this particular operator 10, in accordance with one illustrative embodiment of the invention, an electron beam 35 of spot cross-section is deflected by the alternating-current synchronizing voltage applied to the sweep plates 36 (just as in the spot beam version of the F-type coder shown in Fig. 6 of the copending application) and the beam oscillates transversely across the apertures in the mask 40. The operator input voltage is applied to sweep plates 12 and it deflects the beam in the longitudinal direction along the apertures. The total electron charge passing through the apertures to the split output target plates 41 and 42 during the half period of alternating-current sweep oscillation thus varies with the operator input voltage in the saw-toothed manner of the P-operator characteristic illustrated in Fig. 1, and the voltage appearing across the balanced capacitors 43 and 44 varies in like manner.

This voltage P(V), added to that of the signal sample V, then produces the coding function F(V), shown in Fig. 1 of the copending application.

The code pulses are generated by the electron beam's crossing the electrode 18, so that the code pulse is included in the code character whenever the operator input voltage deflects the beam to the upper set of apertures (i. e., 463 and 464) of mask 40 (as shown in the end view of Fig. 4). When a sine wave sweep is used, these apertures are not exactly triangular, but are shaped as disclosed in the copending application in describing the F-type operator in its spot beam version.

The fine wire 16 at the division line of the apertures furnishes feedback to sweep plates 12 and, as discussed in the copending application for the case of the F-type operator, prevents the beam from ever falling directly on the division line and thereby giving an ambiguous output.

The coding circuit depicted in Fig. 2 is balanced and contains two electronic clamps 47 and 48, each of which is a double clamp in which a timing pulse closes both members simultaneously. Any of a number of circuits well known in the electronic art may be employed for such "clamping" purposes. For example, two single clamps of the type shown in volume 19 of the M. I. T. Radiation Laboratory Series, Wave Forms, at page 376, Fig. 10.12, may be connected in push-pull and used as such a balanced double clamp. Clamp 47 is closed by timing pulses $P_1$ to begin a code character by introducing the signal input voltage sample that is to be coded and then remains open until the complete code character is formed. Clamp 48, operated by timing pulses $P_2$, furnishes the repeated feedback to the operator, closing for a number of times equal to the number of digits required in the code character.

This P-type operator 10 does not give an output at all times, but is synchronized so that it gives an output only in the periods between closings of clamp 48. At the beginning of a code character, clamp 47 closes and charges the combination of capacitors 43 and 44 to the signal voltage $V_o$ that is to be coded. Clamp 48 is also closed at this time and capacitor 25 is also charged. Both clamps 47 and 48 open and the synchronizing wave sweeps the beam past the apertures and adds a charge to capacitors 43 and 44. The gain of the balanced amplifier 45 is adjusted so that the added voltage on the combination of capacitors 43 and 44 is P(V), and the new charge, therefore, on capacitors 43 and 44 is $Vo+P(V_o)$.

This charge is retained on the capacitors until, on the next closing of the clamp 48, the process is repeated on the new charge. The clamp 48 continues to close periodically until the code character is complete, a code pulse being produced whenever the beam crosses the coding electrode 18. A multivibrator 49 is used in the code voltage output circuit, since the same problems in regard to pulse code duration are encountered here as in the spot-beam version of the F-type coder, illustrated in Fig. 6 of the copending application and discussed therein. It is also possible, therefore, to employ a code output circuit such as that appearing in Fig. 9 of the copending application if the coding electrode 18 is constructed in two parts, as illustrated in Fig. 11 of that application and discussed in connection therewith.

The temporal relationships of the timing pulses, synchronizing voltage, and output voltages are shown in Fig. 3. Fig. 3*a* is a plot of timing pulses $P_1$ as a function of time; Fig. 3*b* is a similar plot of timing pulses $P_2$; and Fig. 3*c* illustrates the alternating current used as a synchronizing voltage in the practice of the invention. The output pulses of the code operator are drawn in Fig. 3*d*, and the coded pulses corresponding to these operator output voltages are shown in Fig. 3*e*. All of these figures are, of course, drawn to the same time scale and are to be read in conjunction with each other.

Figure 5:
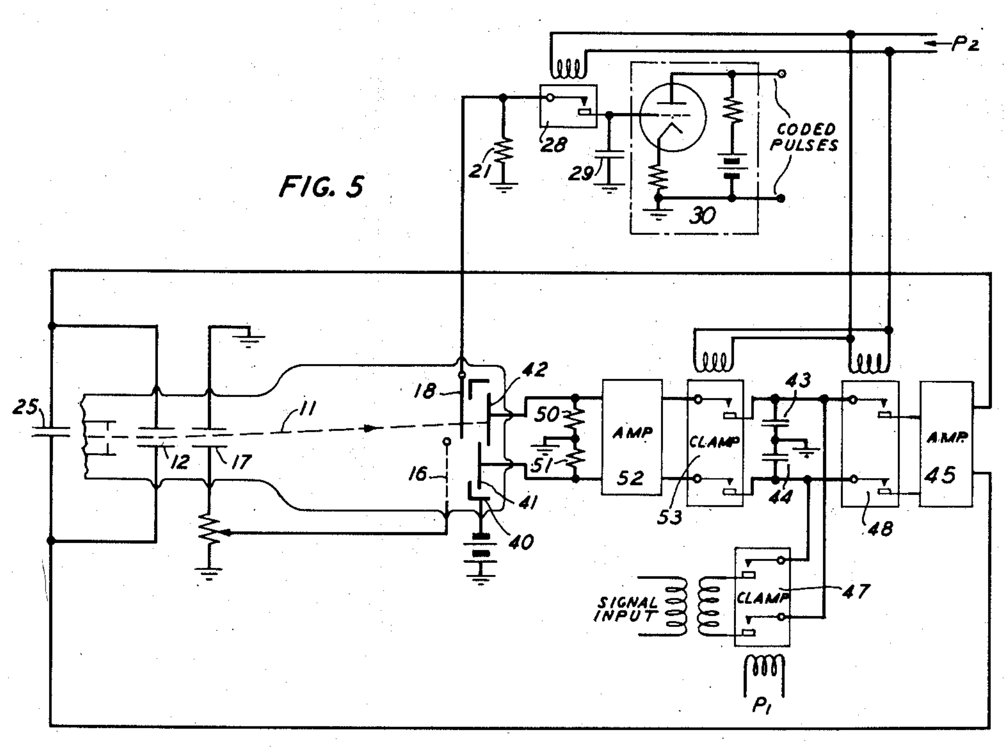
Fig. 5 depicts still another embodiment of the invention, differing from that shown in Fig. 2 in that a beam of ribbon cross-section is used in the coding tube.

Just as embodiments of the F-type operator may employ either a spot or a ribbon beam, it is also in accordance with the invention to use a ribbon beam in the P-type operator instead of the spot beam system already described, and one such arrangement of the P-type operator using a ribbon beam is shown in Fig. 5. Clamp 47 is closed by a pulse $P_1$ to begin a code character and the combination of capacitors 43 and 44 is charged to the signal voltage value that is to be coded. Clamp 47 then opens and remains open until the code character is completed. Then clamp 48 is closed and clamp 53 is opened by a pulse $P_2$ so that capacitor 25 is charged to the voltage value appearing across capacitors 43 and 44. This voltage then also appears across sweep plates 12 and deflects the beam 11, which impinges on the mask 40, apertured as shown in Fig. 4. As a result of this arrangement, the voltage drop across resistors 50 and 51 owing to the electron current passing through the apertures to the output electrodes 41 and 42 varies according to the function P(V), as plotted in Fig. 1. This voltage is then added to that on the capacitors 43 and 44 when clamp 53 is closed, thereby providing the basic coding function $$F(V)=V+P(V)$$

which is plotted in Fig. 1 of the copending application.

Clamp 28 is closed when clamp 48 is closed, so that if the beam rests on the coding electrode 18 the voltage drop across resistor 21 is clamped on capacitor 29. The latter capacitor is connected to the grid of the cathode follower 30 and each code pulse from the follower has a time length equal to a pulse period, with clamps 48 and 53 then opening and closing alternately until the code character is completed. The amplifier shown as block 52 is used for purposes of isolation, i. e., so that the charge on capacitors 43 and 44 does not upset the operator function and also that the converse does not happen. Amplifier 45 in this ribbon beam version serves the same function as the corresponding amplifier 45 in the spot beam version, shown in Fig. 2 and described above.

It is to be understood that the above-described arrangements are illustrative of the application of the principles of the invention. Numerous other arrangements may be devised by those skilled in the art without departing from the spirit and scope of the invention. In this regard, it is worthy of note that for simplicity, the coding circuits (both spot and ribbon) have been shown only in balanced form. In accordance with the invention, they can, however, be unbalanced, and this can be done in the manner disclosed in the aforementioned copending application for the so-called F-type operator. It is manifest, of course, that all of the embodiments of the P-type coder in both balanced and unbalanced forms are equally within the practice of the invention.

What is claimed is:

1. In a system for representing samples of a message wave by permutation code groups of $n$ bivalued pulses, $n$ being any positive integer, covering an amplitude range $a$ in $2^n$ steps, means for sampling the message wave, a coder element having input and output terminals and adapted to produce an output equal to the input for all inputs less than one-half $a$ and an output equal to the input minus $a$ for all inputs greater than one-half $a$ and including means for producing a signal pulse of one of the two values for all inputs less than one-half $a$ and a signal pulse of the other of said two values for all inputs greater than one-half $a$, means for applying the message wave sample to the input terminals of said coder element for the production of the first code element pulse, and means for applying the output of said coder element resulting from the production of each code element pulse to the input of said coder element for the production of the next code element pulse.

2. In a system for representing samples of a message wave by permutation code groups of $n$ bivalued pulses, $n$ being any positive integer, covering an amplitude range $a$ in $2^n$ steps, means for sampling the message wave, a cathode-ray tube coder having input and output terminals and adapted to produce an output equal to the input for all inputs less than one-half $a$ and an output equal to the input minus $a$ for all inputs greater than one-half $a$ and including means for producing a signal pulse of one of the two values for all inputs less than one-half $a$ and a signal pulse of the other of said two values for all inputs greater than one-half $a$, means for applying the message wave sample to the input terminals of said coder element for the production of the first code element pulse, and means for applying the output of said coder element resulting from the production of each code element pulse to the input of said coder element for the production of the next code element pulse.

3. In a system for representing samples of a message wave by permutation code groups of $n$ bivalued pulses, $n$ being any positive integer, covering an amplitude range $a$ in $2^n$ steps, means for sampling the message wave, a coder element having input and output elements and including a cathode-ray tube which comprises means for producing an electron beam, beam deflecting plates, a mask, and a collector target beyond said mask, said mask being so apertured that the output produced by an electron beam impinging on said target is adapted to produce an output equal to the input for all inputs less than one-half $a$ and an output equal to the input minus $a$ for all inputs greater than one-half $a$ and including means for producing a signal pulse of one of the two values for all inputs less than one-half $a$ and a signal pulse of the other of said two values for all inputs greater than one-half $a$, means for applying the message wave sample to the input terminals of said coder element for the production of the first code element pulse, and means for applying the output of said coder element resulting from the production of each code element pulse to the input of said coder element for the production of the next code element pulse.

4. A cathode-ray tube comprising means for producing an electron beam of ribbon cross-section, beam deflecting plates, means for applying an input signal to said beam deflecting plates, an apertured mask, and a collector target beyond said mask, the aperture of said mask having a shape and orientation to permit electrons from said beam to travel therethrough and impinge on said target to produce an output proportional to the amplitude of the input to said deflecting plates when said input amplitude is less than one-half the maximum amplitude range and with an amplitude proportional to the input amplitude minus said maximum amplitude range when said input amplitude is greater than one-half said maximum amplitude range.

5. A cathode-ray tube comprising means for producing an electron beam of spot cross-section, beam deflecting plates, means for applying an input signal to said beam deflecting plates, an apertured mask, and a collector target beyond said mask, the aperture of said mask having a shape and orientation to permit electrons from said beam to travel therethrough and impinge on said target to produce an output proportional to the amplitude of the input to said deflecting plates when said input amplitude is less than one-half the maximum amplitude range and with an amplitude proportional to the input amplitude minus said maximum amplitude range when said input amplitude is greater than one-half said maximum amplitude range.

6. A coder element adapted to cover an amplitude range $a$ and having input and output terminals and including a cathode-ray tube which comprises means for producing an electron beam, beam deflecting plates, a mask, and a collector target beyond said mask, said mask being so apertured that the output produced by an electron beam impinging on said target contributes to production of an output equal to the input for all inputs less than one-half $a$ and an output equal to the input minus $a$ for all inputs greater than one-half $a$ and including means for producing a signal pulse for one of two values for all inputs less than one-half $a$ and a signal pulse of the other of said two values for all inputs greater than one-half $a$, said means for producing a signal pulse including at least one electrode which is adapted to produce a signal when impinged upon by a stream of electrons.

7. A coder element adapted to cover an amplitude range $a$ and having input and output terminals and including a cathode-ray tube which comprises means for producing an electron beam, beam deflecting plates, a mask, and a collector target beyond said mask, said mask being so apertured that the output produced by an electron beam impinging on said target contributes to production of an output equal to the input for all inputs less than one-half $a$ and an output equal to the input minus $a$ for all inputs greater than one-half $a$ and including means for producing a signal pulse for one of two values for all inputs less than one-half $a$ and a signal pulse of the other of said two values for all inputs greater than one-half $a$, said means for producing a signal pulse including at least one electrode which is adapted to produce a signal when impinged upon by a stream of electrons, said electrode being so positioned as to be in the path of the deflected electron beam only when the beam has been deflected by a signal of amplitude greater than one-half the amplitude range $a$ covered by the system.

8. A coder element adapted to cover an amplitude range $a$ and having input and output terminals and including a cathode-ray tube which comprises means for producing an electron beam, beam deflecting plates, a mask, and a collector target beyond said mask, said mask being so apertured that the output produced by an electron beam impinging on said target contributes to production of an output equal to the input for all inputs less than one-half $a$ and an output equal to the input minus $a$ for all inputs greater than one-half $a$ and including means for producing a signal pulse for one of two values for all inputs less than one-half $a$ and a signal pulse of the other of said two values for all inputs greater than one-half $a$, said means for producing a signal pulse comprising at least one electrode which is adapted to produce a signal when impinged upon by a stream of electrons and a multivibrator which is adapted to produce a pulse of the required amplitude and duration when energized by a signal from said electrode.

9. A coder element adapted to cover an amplitude range $a$ and having input and output terminals and including a cathode-ray tube which comprises means for producing an electron beam, beam deflecting plates, a mask, and a collector target beyond said mask, said mask being so apertured that the output produced by an electron beam impinging on said target contributes to production of an output equal to the input for all inputs less than one-half $a$ and an output equal to the input minus $a$ for all inputs greater than one-half $a$ and including means for producing a signal pulse for one of two values for all inputs less than one-half $a$ and a signal pulse of the other of said two values for all inputs greater than one-half $a$, said means for producing a signal pulse comprising at least one electrode which is adapted to produce a signal when impinged upon by a stream of electrons and a cathode-follower circuit which is adapted to produce a pulse of the required amplitude and duration when energized by a signal from said electrode.

10. The invention according to claim 3, said mask having two apertures of substantially triangular shape.

11. The invention according to claim 3, said mask having one aperture of substantially rhombic shape.

FRANK GRAY.

REFERENCES CITED

The following references are of record in the file of this patent:

UNITED STATES PATENTS

| Number | Name | Date |
|---|---|---|
| 1,757,345 | Strobel | May 6, 1930 |
| 2,257,795 | Gray | Oct. 7, 1941 |